United States Patent [19]

Wieneke

[11] Patent Number: 4,920,737
[45] Date of Patent: May 1, 1990

[54] WORM MOWER

[75] Inventor: Franz Wieneke, Bovenden, Fed. Rep. of Germany

[73] Assignee: Münich, Steinmann, Schiller, München, Fed. Rep. of Germany

[21] Appl. No.: 221,255

[22] PCT Filed: Oct. 22, 1987

[86] PCT No.: PCT/DE87/00480
§ 371 Date: Jun. 22, 1988
§ 102(e) Date: Jun. 22, 1988

[87] PCT Pub. No.: WO88/02983
PCT Pub. Date: May 5, 1988

[30] Foreign Application Priority Data

Oct. 22, 1986 [DE] Fed. Rep. of Germany ....... 3635925
Jan. 22, 1987 [DE] Fed. Rep. of Germany ....... 3701668

[51] Int. Cl.$^5$ ............................................. A01D 34/53
[52] U.S. Cl. ........................................ 56/249; 56/294
[58] Field of Search ............... 56/249, 294, 249.5–254, 56/12.9, 13.1, 14.3, 14.4, 504, 503, 500

[56] References Cited

U.S. PATENT DOCUMENTS

| | | | |
|---|---|---|---|
| 1,122,375 | 12/1914 | Engle | 56/12.9 |
| 2,063,067 | 12/1936 | Waller | 56/252 |
| 2,204,256 | 6/1940 | Picha | 56/252 |
| 2,299,384 | 10/1942 | Day | 56/249 |
| 2,654,208 | 10/1953 | Pasturczak | 56/252 |
| 2,990,019 | 6/1961 | Finn | 56/12.9 |
| 3,028,717 | 4/1962 | West | 56/12.9 |
| 3,073,100 | 1/1963 | Kingsley | 56/294 |
| 3,084,493 | 4/1963 | Kucera | 56/294 |
| 3,147,577 | 9/1964 | McClellan | 56/504 |
| 3,165,875 | 1/1965 | Mitchell | 56/504 |
| 3,188,786 | 6/1965 | Sammet | 56/12.9 |
| 3,193,995 | 7/1965 | Miller | 56/12.9 |
| 3,212,247 | 10/1965 | Erickson | 56/13.1 |
| 3,430,421 | 3/1969 | Matthews | 56/12.9 |
| 3,555,790 | 1/1971 | Quick | 56/14.4 |
| 3,673,772 | 7/1972 | Holzhei | 56/13.1 |
| 3,862,539 | 1/1975 | Stevens | 56/294 |
| 3,961,465 | 6/1976 | Winings | 56/13.1 |
| 3,964,245 | 6/1976 | Hecht | 56/12.9 |
| 4,148,174 | 4/1979 | Mathews | 56/504 |
| 4,550,554 | 11/1985 | Lundahl | 56/121.42 |
| 4,563,867 | 1/1986 | Bokon | 56/249 |
| 4,730,444 | 3/1988 | Leffel | 56/13.1 |
| 4,783,951 | 11/1988 | Richards | 56/12.9 |

FOREIGN PATENT DOCUMENTS 2808243 8/1979 Fed. Rep. of Germany ....... 56/12.9

Primary Examiner—Stephen J. Novosad
Assistant Examiner—Gay Spahn
Attorney, Agent, or Firm—Barnes & Thornburg

[57] ABSTRACT

A worm mower for cutting stalk material of any kind is provided, which has a mowing worm, which turns at a high circumferential velocity, and angle of inclination smaller than the angle of friction (glide angle) of the material to be cut, and wherein the circumference of the worm is provided in the axial direction with a continuous cutting surface, which runs parallel to or inclined toward the worm axis, or is stepped with respect thereto.

22 Claims, 13 Drawing Sheets

WORM MOWER

BACKGROUND AND SUMMARY OF THE INVENTION

The present invention relates to a worm mower for cutting stalk material of any kind utilizing a moving worm which turns at a high circumferential velocity.

Worm mowers that turn at high circumferential velocities feature rotating cutting devices which cut the material to be mowed in a free cut. Furthermore, worm mowers of this type can also discharge the cut material to the side or over the top.

The suggested prior art worm mowers proved to be inadequate due to their unsatisfactory cutting quality.

Worm mowers must be differentiated from spindle mowers, the cutting bars of which run either longitudinally or slightly inclined along the circumference, and operate jointly with a counter-cutting blade on the bottom. Mowers of this type are used for cutting lawn areas with short-stalked grass.

One reason that worm mowers are not particularly suited for mowing is that the worm bends the blades or leaves considerably to the side, thereby making cutting difficult and also leaving the stubble longer.

Furthermore, compared to cutting with a blade running parallel to the axis, when cutting with a worm, there is a reduction in cutting velocity $u_1$ proportionate to the pitch of the worm. The number of revolutions of the worm must be increased accordingly in order to attain the cutting velocity required to cut through the stalk. Consequently, the construction is more elaborate in order to give the machine necessary stability.

The tangential sliding velocity $u_2$ can practically, however, not yield a drawing cut, because the helicoid surface of the worm runs in a vertical direction to the shaft.

Moreover, for a number of mowing operations, it is desired that the cut material be deposited somehow.

The primary object of the present invention is to provide a worm mower that permits mowing in a free cut at a low as possible circumferential velocity of the worm, and that if required, permits depositing of the cut material in a swath by exploiting the axial discharge effect of the same worm.

A solution of this object in accordance with the present invention and its further embodiments is described in the claims hereto.

An element of the present invention is that the pitch of the mowing worm ($\alpha$) is less than the angle of friction of the material to be cut; furthermore, along its circumference the mowing worm is provided with a continuous or stepped cutting surface, arranged parallel to or inclined toward the axis of the worm.

For the axial discharge of the material to be cut in a swath or into a shredder or simply to the side, a section of the circumference of the mowing worm may be covered with a hood over its entire width, which at the same time also assumes a safety function.

It is especially difficult, as is well-known, to cut fine, almost dead leaf and stalk material in a free cut. To do so requires high cutting velocities, so that in order to keep the number of revolutions relatively low, a blade stepped in the axial direction would have to be employed as the cutting worm. However, loose, wilted blades of grass and fine stalks can stick to such a stepped blade.

For this reason, the cutting steps are designed somewhat oblique in the inclined or axial-parallel running circumference of the worm in the preferred further embodiments of the invention.

BRIEF DESCRIPTION OF THE DRAWINGS

In the following, the present invention is made more apparent using preferred embodiments with reference to the attached drawing, depicting.

DETAILED DESCRIPTION OF THE DRAWINGS

Figure 1:
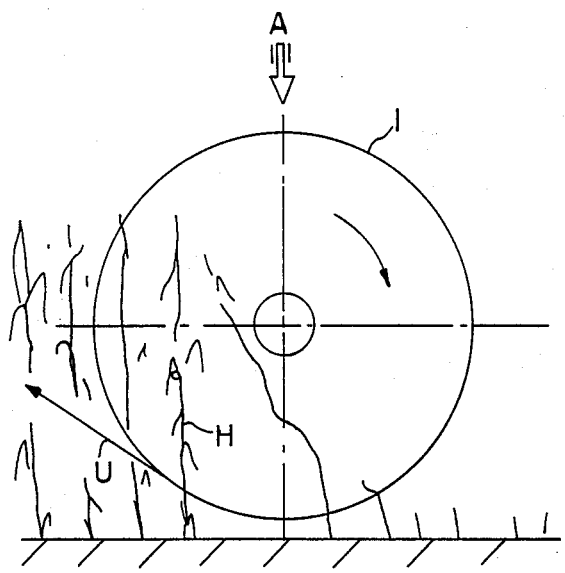
FIG. 1 shows a schematic end view of the mowing worm.
Figure 2:
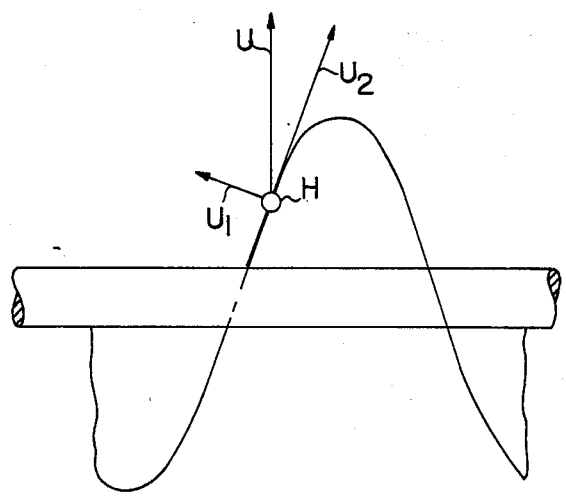
FIG. 2 shows a schematic plan view of the worm shown in FIG. 1 viewed along the direction A of FIG. 1.

FIG. 1 shows a worm mower with a worm cutting blade 1 rotating clockwise and with uncut material H to the left of the blade. The cutting velocity $U_1$ of the blade, i.e., that velocity at right angles to the blade, is made up from the circumferential velocity U of the blade minus the sliding velocity $U_2$.

Figure 3:
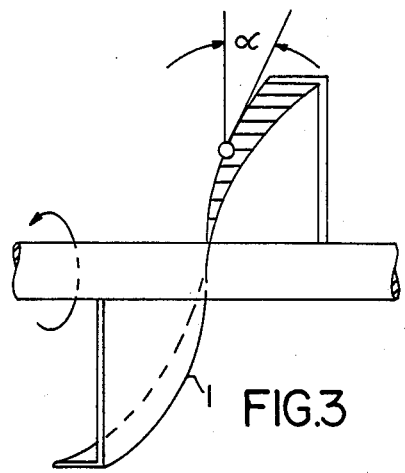
FIGS. 3–5 show the fundamental principle of the invented worm mower with emphasis on the cutting edge of the worm.
Figure 4:
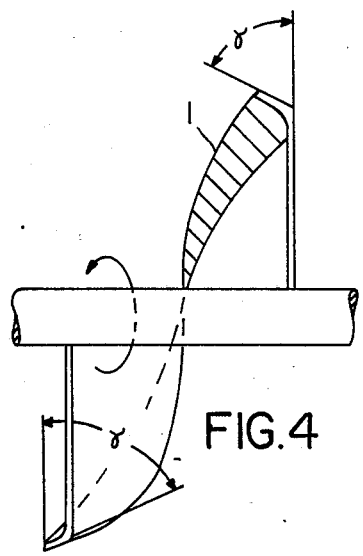
Figure 5:
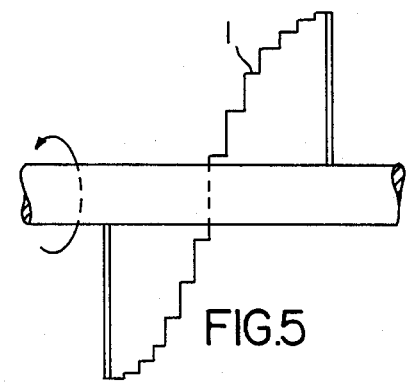

FIGS. 3 to 5 illustrate the invented angle of inclination of the worm surface; this angle of inclination is smaller than the angle of friction of the material to be cut by the worm, and consequently, the cut material slips (slides) sideways off the worm surface. The angle of friction is defined by that angle of inclination of a ramp wherein a mass on the ramp overcomes the frictional force with the ramp and begins to slide down the ramp. Thus, the angle $\alpha$ of the auger must be less than the angle which would cause the material to slide along the blade due to overcoming of the friction forces between the material to be cut and the blade surface. By way of illustration, for fresh stalk material, this slipping off the steel surface occurs in the range $\alpha = 30°$ to $35°$.

In this manner, an axial discharge of the cut material is made possible. As a result of this relatively small angle of inclination, however, there is a sharp drop in the actual cutting velocity $U_1$ in relation to the circumferential velocity U.

In order not to have to raise the number of rotations of the mowing worm, the circumference of the cutting surface of the worm is inclined (FIG. 4) or stepped (FIG. 5) parallel to the axis of rotation. In this manner, a drawing, and in the latter case a striking cut, is attained at a relatively low circumferential velocity.

FIGS. 6 to 13 show lateral views of various modifications of a first preferred embodiment of the present invention.

In these variations, a section of the mowing worm 1 is covered with a hood 2. The hood 2 is raised in front in the moving direction in such a manner that the material to be mowed can flow more easily into the free space between the hood and the worm. In the upper and rear area, the hood prevents stones from being hurled out and passes the cut material to the ground (FIGS. 6 to 9), or into a catching basket (FIG. 10), as is desired with lawn mowers.

Figure 6:
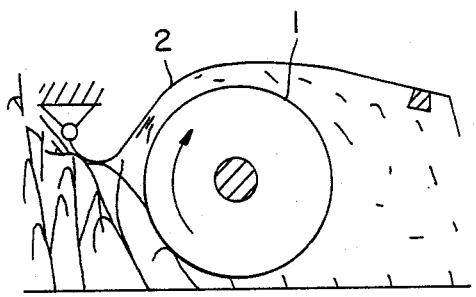
FIGS. 6–13 show variations of a first preferred embodiment of the present invention wherein various covers are provided for the worm to channel the flow of cut material (FIG. 9 is viewed along the direction B of FIG. 8, and FIG. 12 is viewed along the direction C in FIG. 11)

FIG. 6 depicts a worm mower, which cuts grass and discharges the cut grass over the top, whereby the hood 2 deposits the cut material onto the ground practically over the entire breadth of the swath. The hood 2 in FIG. 6 is not provided with deflecting bars so that the mowed material is deposited loosely and intact.

Figure 7:
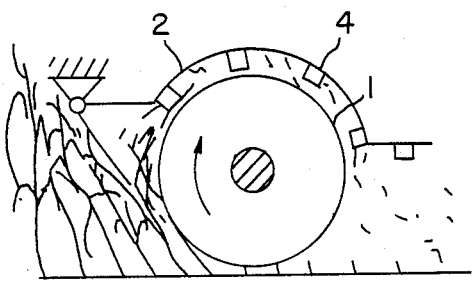
Figure 8:
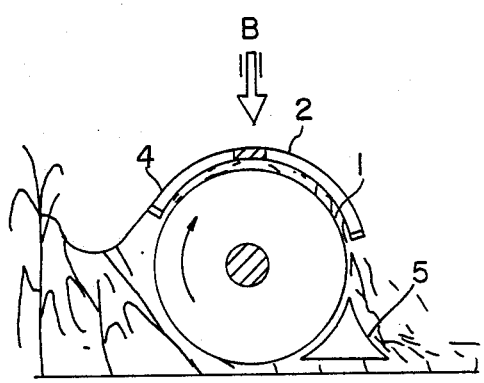
Figure 9:
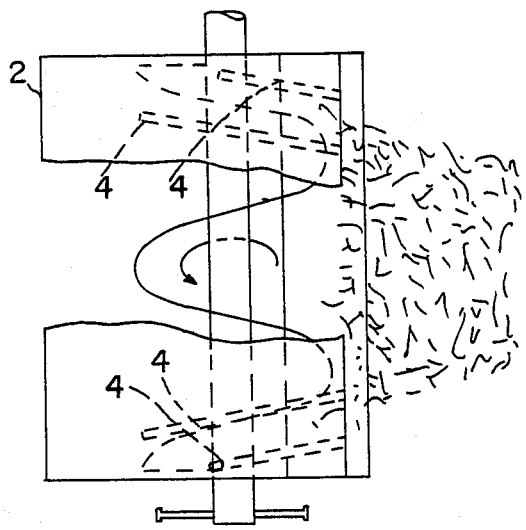

On the other hand, the hoods of the variants illustrated in FIGS. 7 and 8 are provided with deflecting bars 4 on the inside which, as FIG. 9 shows in a top view, slightly channels the mowed material in width. At the same time, the bars 4 serve as stops or as counter-cutting blades for the mechanical processing of the cut material in order to shorten the drying time on the field. The degree of processing, of beating and of cutting may be altered by the number of bars and their pitch.

In FIG. 9, the worm is inclined toward the center from both sides, and channels the mowed material somewhat to the center if the bars 4 run parallel to the axis of the worm. The bars 4 channel more to the center if they are inclined toward the center on both sides, as shown in FIG. 9.

Very intensely beaten and shortened cut material would be thrown in between the stubble and not be grasped by the prongs of a pick-up drum after the cut material has wilted or dried on the ground.

For this reason, the intensely processed mowed material is first projected onto a guide surface 5 and compressed to a carpet in slipping off and being deposited onto the stubble (FIG. 8). The partially dry or completely dry carpet of stalk material holds together due to its fibrous structure and can be picked up and transported by pick-up devices without loss from falling apart.

Figure 10:
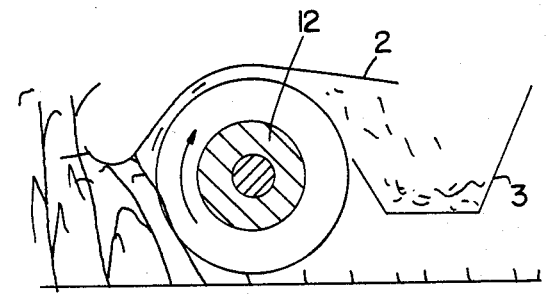

FIG. 10 shows a rotor 12 of an electric motor built around the shaft of the worm mower for driving the same. A basket 3 is provided to receive the cuttings of the mower.

The mowing worm itself is also suited for picking up the stalk material carpet.

Figure 11:
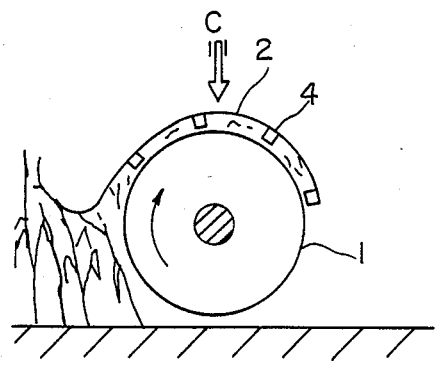
Figure 12:
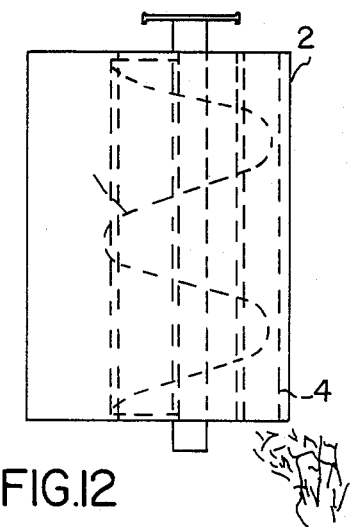

FIGS. 11 and 12 show a variation wherein the inside of the hood is provided with guide bars 4, which run parallel to the axis of the worm, for axial discharge. The arrangement according to FIGS. 11 and 12, of course, also permits mowing standing stalk material and depositing it in a swath to the side.

Figure 13:
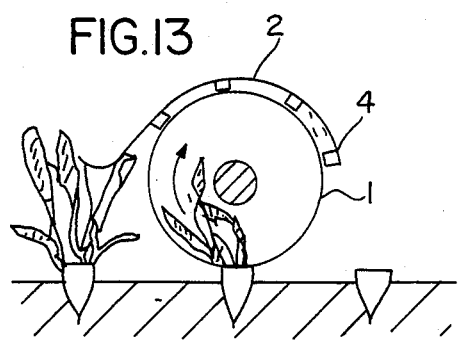

The variation illustrated in FIG. 13 is particularly suited for topping off several rows of root crop. The severed (topped-off) leafage is guided longitudinally along the bars 4 and discharged to the side.

Figure 14:
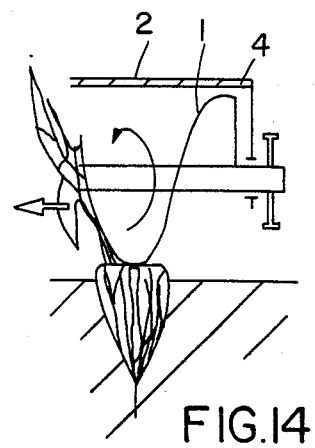
FIGS. 14 and 15 show a second preferred embodiment, which is particularly suited for topping rows of root crops.
Figure 15:
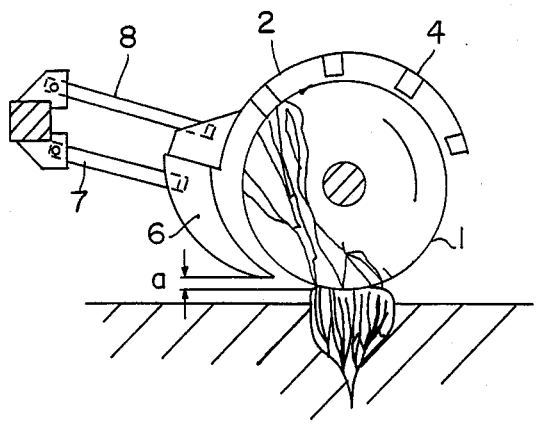

FIGS. 14 and 15 depict a short mowing worm for topping rows of root crop. The mowing worm is surrounded by a hood 2, which is provided with a tactile device 6 (FIG. 15) on the front. The inside of the hood is provided with bars which run parallel to the axis. The severed leafage is discharged to the side. Mowing worm and hood are considered as a single unit by an articulated parallelogram 7, 8. The lower rod 7 is shorter than the top one so that the mowing worm 1 with the tactile device 6 tips backwards when raised, and thus the distance "a" between the lower edge of the tactile device 6 and the outer line of the worm becomes larger, and by this means, the amount of topping off is controlled.

Figure 17:
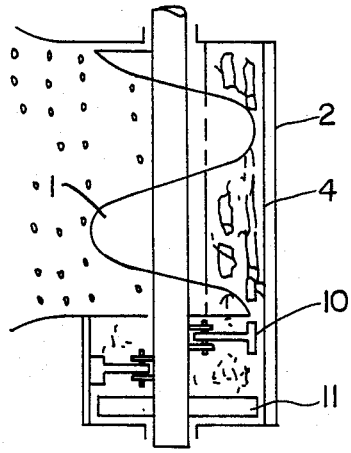
FIGS. 16–18 show a third preferred embodiment of the present invention, in which the mowing worm is combined with a shredder (FIG. 17 is viewed along the direction D of FIG. 16)
Figure 16:
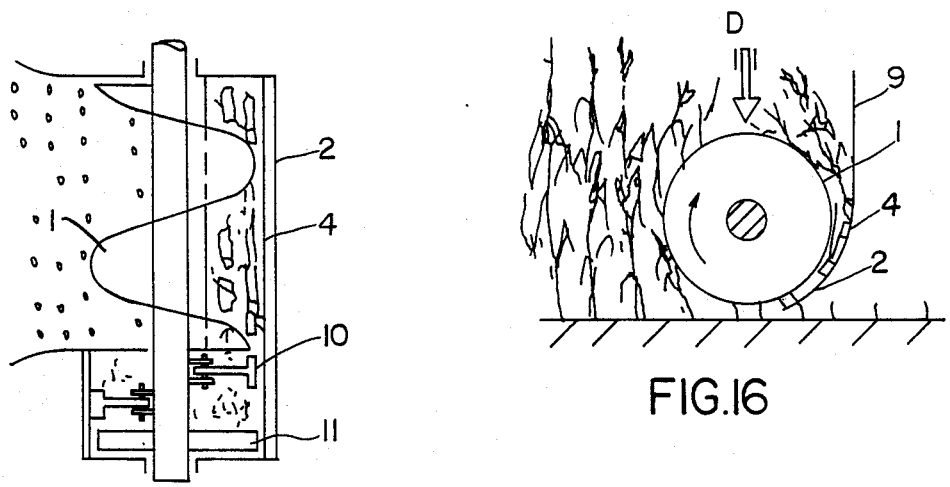
Figure 18:
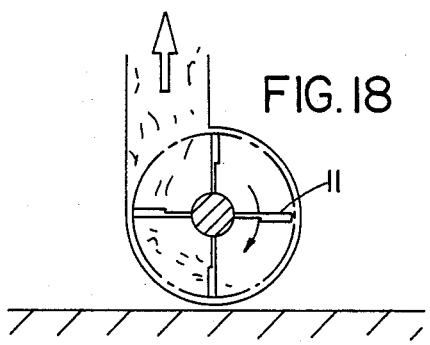

FIGS. 16 to 18 depict a third preferred embodiment wherein there is a combination of mowing worm and a shredder.

The mowing worm 1 severs the stalks or cornstalks and throws them over the top into a trough, formed by the hood 2 with its upward extension 9. The axially arranged bars 4 guide the mowed material into the shredder 10. The shredder material is discharged by the ejection wheel 11.

The clockwise turning direction of the mowing worm results in an over-the-top discharge of the cut material, and thereby facilitates pick up or other operations; e.g., processing or conveyance in a specific direction can then easily follow.

For the task of mowing and mulching, the mowing worm can eject the mowed material in an undershot manner and if required-when provided with additional tools-eject earth, and in this manner mix the mowed material with the earth.

Figure 19:
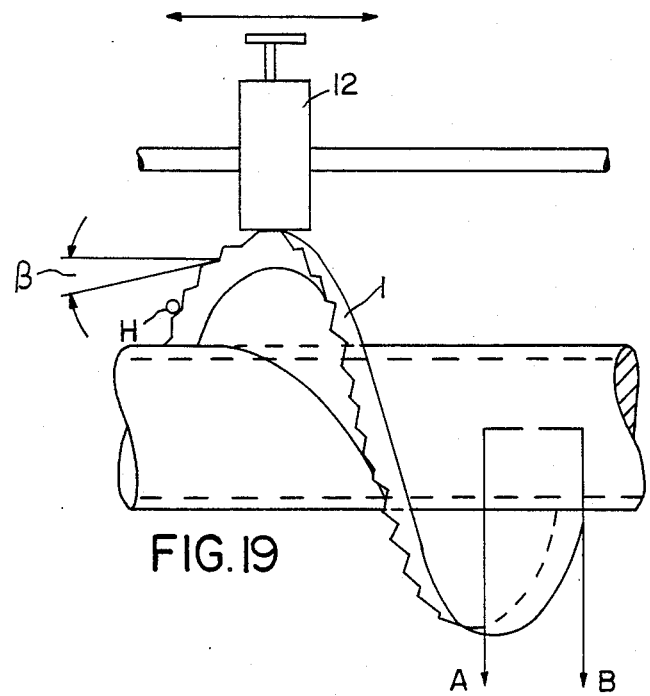
FIGS. 19–21 show a fourth preferred embodiment of the present invention wherein the stepped blade of the worm has somewhat oblique or inclined edges (FIG. 20 is a section along line A-B of FIG. 19)

FIG. 19 and the following figures depict a fourth preferred embodiment of the present invention having a worm blade design, which is particularly suited for cutting almost dead, fine leaf and stalk material in a free cut. High cutting velocities are required for this purpose, so that a blade, which is stepped in a direction parallel to the axis, would have to be employed as the cutting worm in order to keep the number of worm rotations relatively low. However, loose, wilted blades of grass and fine stalks can stick to such a stepped blade.

Figure 20:
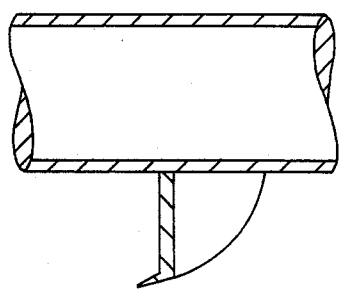
Figure 21:
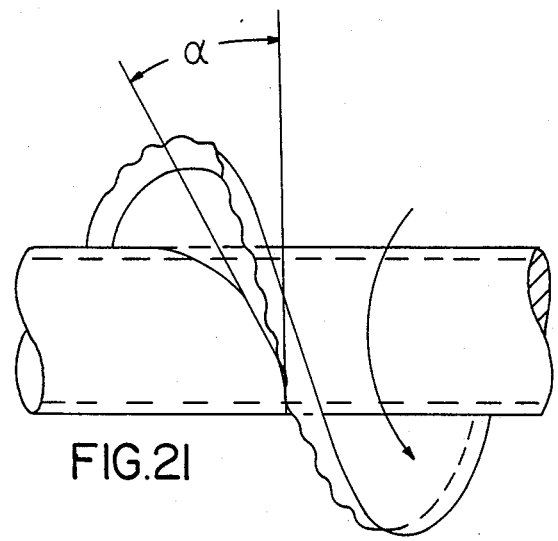

For this reason, in accordance with the present invention, the blade steps are designed somewhat oblique in the inclined or axial-parallel running circumference of the worm, as FIGS. 19 and 20 show in a top view of the mowing worm 1. The fine stalk H or fibrous leafage slide off the step, which is inclined downward under the angle $\beta$.

A wave-shaped ground edge of the inclined or axial-parallel worm circumference (FIG. 20) is suited for fresh material to be cut, by way of illustration turgid, green root crop leafage.

The blade of a mowing worm of considerable breadth can be sharpened during rotation with a whetstone 12, which is moved back and forth (FIG. 19). Sharpening can be carried out in a simple manner, particularly in the case of short worms, by means of a bar or flap, which lies on the worm across the entire breadth of its swath and carries a whetstone.

FIGS. 22 to 27 depict various combinations of mowing worm, tactile device and follow-up topper.

Figure 22:
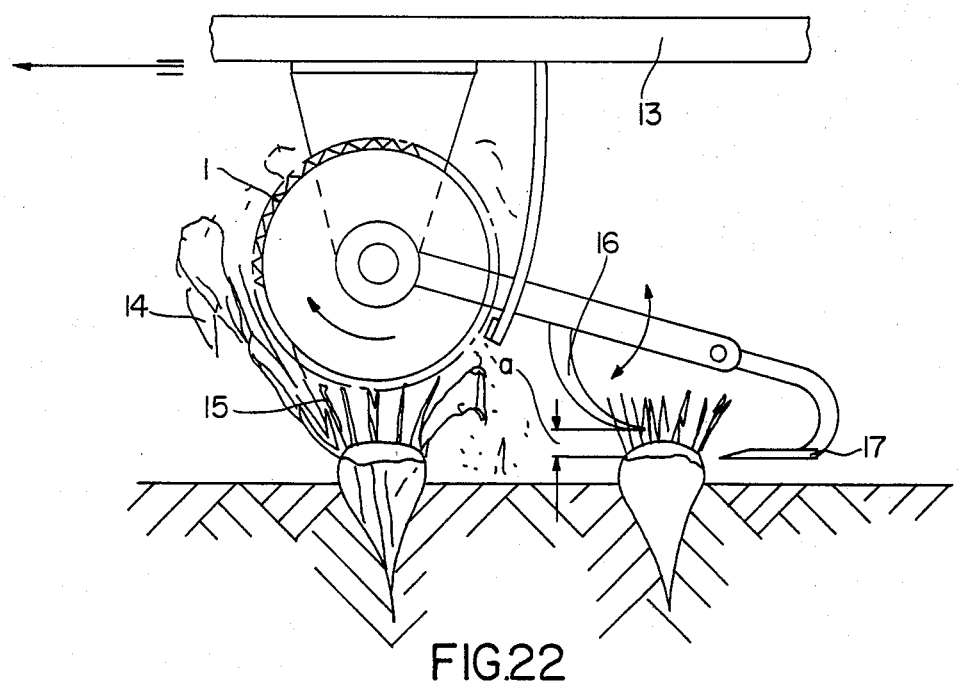
FIGS. 22–27 show different variations of a fifth preferred embodiment, which is particularly suited for topping root crops.

For preliminary topping of the leafage of several rows, the mowing worm 1 is securely attached to a frame 13. The mowed off leafage may be discharged to the side, as already described in the preceding section, or as illustrated in FIG. 22 with a toothed mowing worm, and discharge finely shredded on the ground over the entire breadth of the swath. The leaf stubble 15 that remains standing after the preliminary topping (mowing off) of the leafage 14 is run over by the second tactile device 16, which is coupled to a knife 17. The distance "a" of the topping knife 17 to the tactile device yields the size of the follow-up topping. The solution illustrated in FIG. 22 represents a simplification and a more compact constructive arrangement compared to the previously used processes of cutting off leafage, discharging to the side and follow-up topping.

The solutions illustrated in FIGS. 23 to 27 relate to topping one row of root crop respectively, and are suited for blockage-free processing of even large amounts of leafage.

Figure 23:
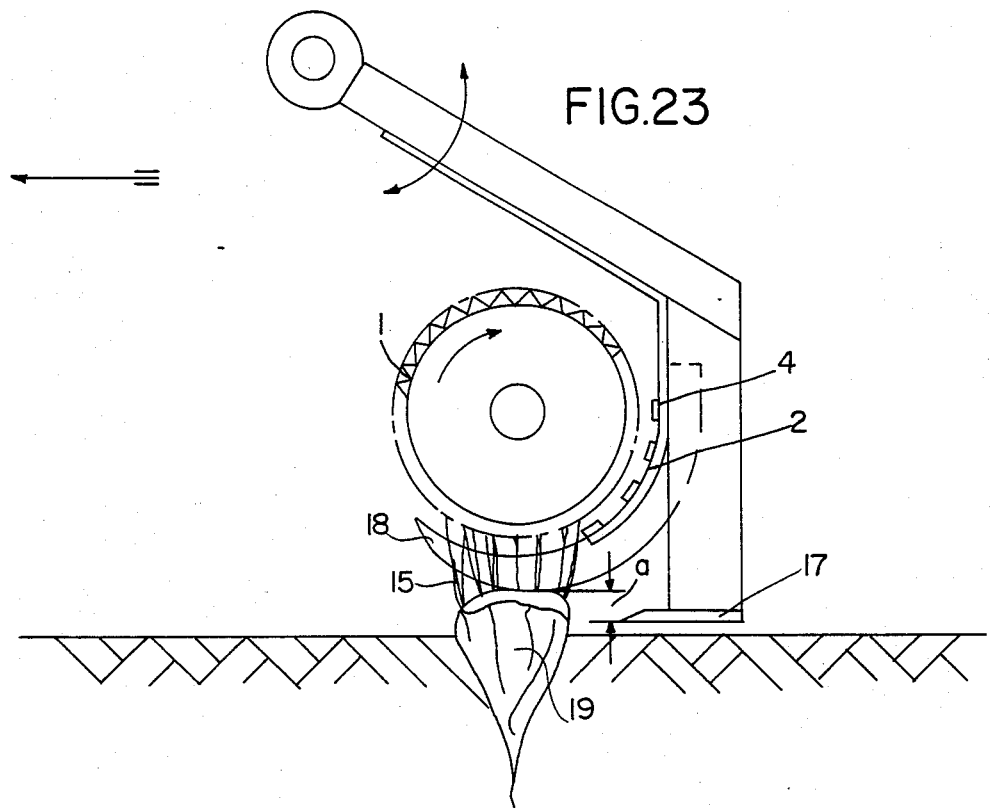
Figure 24:
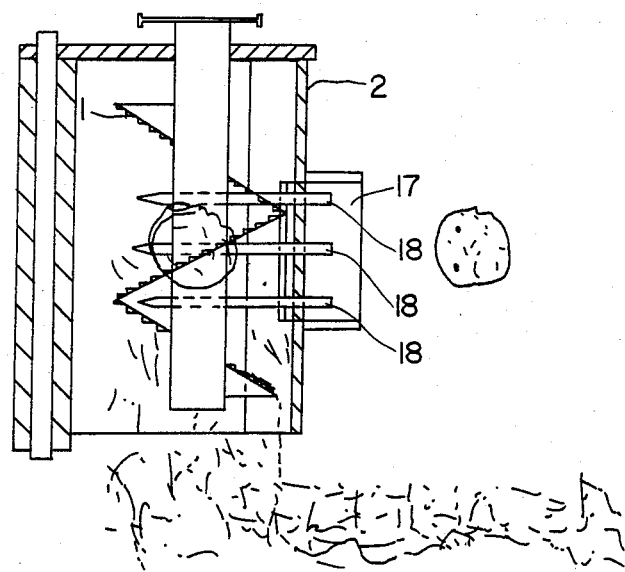

In FIGS. 23 and 24, the worm 1 mows the root crop leafage 14 down to the stubble 15. In the rear area, the mowing worm 1 is covered by a hood 2, the inside of which is provided with bars 4 that run parallel to the axis. Attached on the rear side of the hood are third tactile fingers 18, which pass through the leafage stubble in front while gliding over the top 19 of the body of the root crop, which is firmly embedded in the ground.

Usually, three or four fingers, spaced 3 cm apart, suffice in order to feel the top of the root crop. Connected to the third tactile fingers 18 is a topping knife 17, which is guided fixedly or by means of hinged squares. The distance "a" between the bottom edge of the third tactile fingers 18 and the topping knife 17 yields the size "a" of the follow-up topping.

The solution illustrated in FIGS. 23 and 24 is distinguished by reliable probing of the top of the root crop, whereby even heavy root crop leafage is removed without difficulty.

Figure 25:
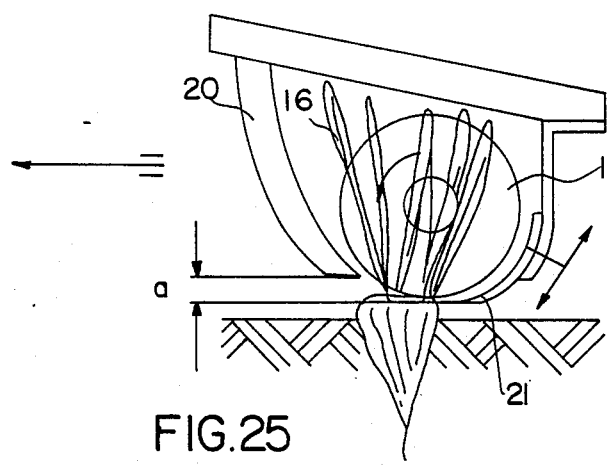

Blockage-free mowing off of the root crop leafage makes the solution according to FIG. 25 possible. The fourth tactile fingers 20 pass through the full leafage 16 before the mowing worm 1 which runs counter-clockwise, thereby continuously removing the mowed leafage from the fourth tactile fingers. The mowing worm 1 works jointly with knife 21; it acts like a counter-blade during the cutting off of the root crop top and prevents the root crop body from being partly broken off by the mowing worm 1. The cutting plane of the knife 21 lies below the bottom edge of the fourth tactile fingers 20 to define the distance "a" of the top size. The fourth tactile fingers 20 can be adjusted in height according to the desired top size "a", whereby the knife 21 can be rotated about the mowing worm 1.

Figure 26:
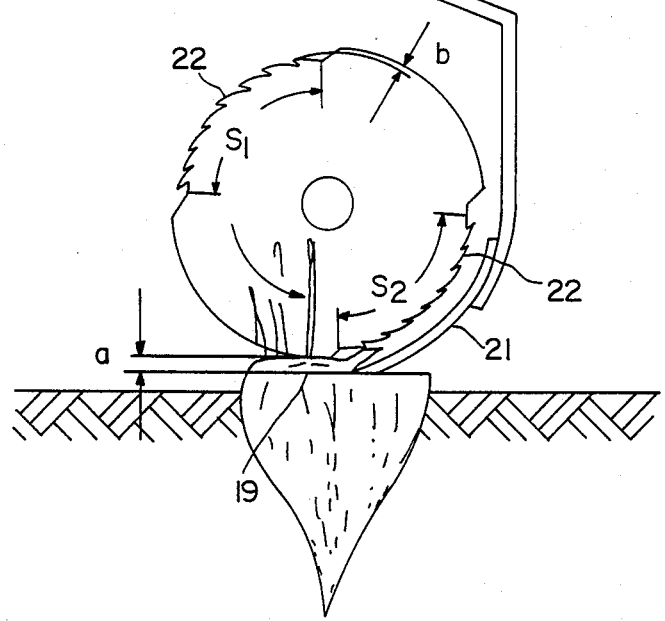
Figure 27:
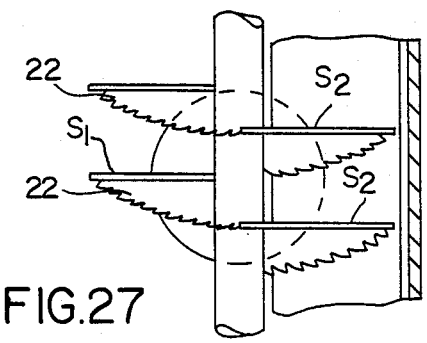

In the solution in accordance with FIGS. 26 and 27, the mowing worm itself provides the probing of the root crop top 19. The continuous blade 22 of the mowing worm 1 is interrupted by sections $s_1$ and $s_2$, which are not sharpened and which extend in a radial direction over the blade 22 by the amount "b". In this manner, the sections $s_1$ and $s_2$ support the worm 1 on the root crop top 19 during rotation. As the support sections $s_1$ and $s_2$ have no, or a slightly negative, pitch in relation to the worm blade, the cutting surface as a whole is practically not interrupted by the support sections. The cutting worm operates jointly with the knife 21. It tops the root crop in accordance with the set distance "a", whereby the topped slice is gathered by the cutting worm and shredded. In this manner, the solution according to FIGS. 26 and 27 permits combining blockage-free mowing of the leafage and precise topping in the most confined space.

Figure 28:
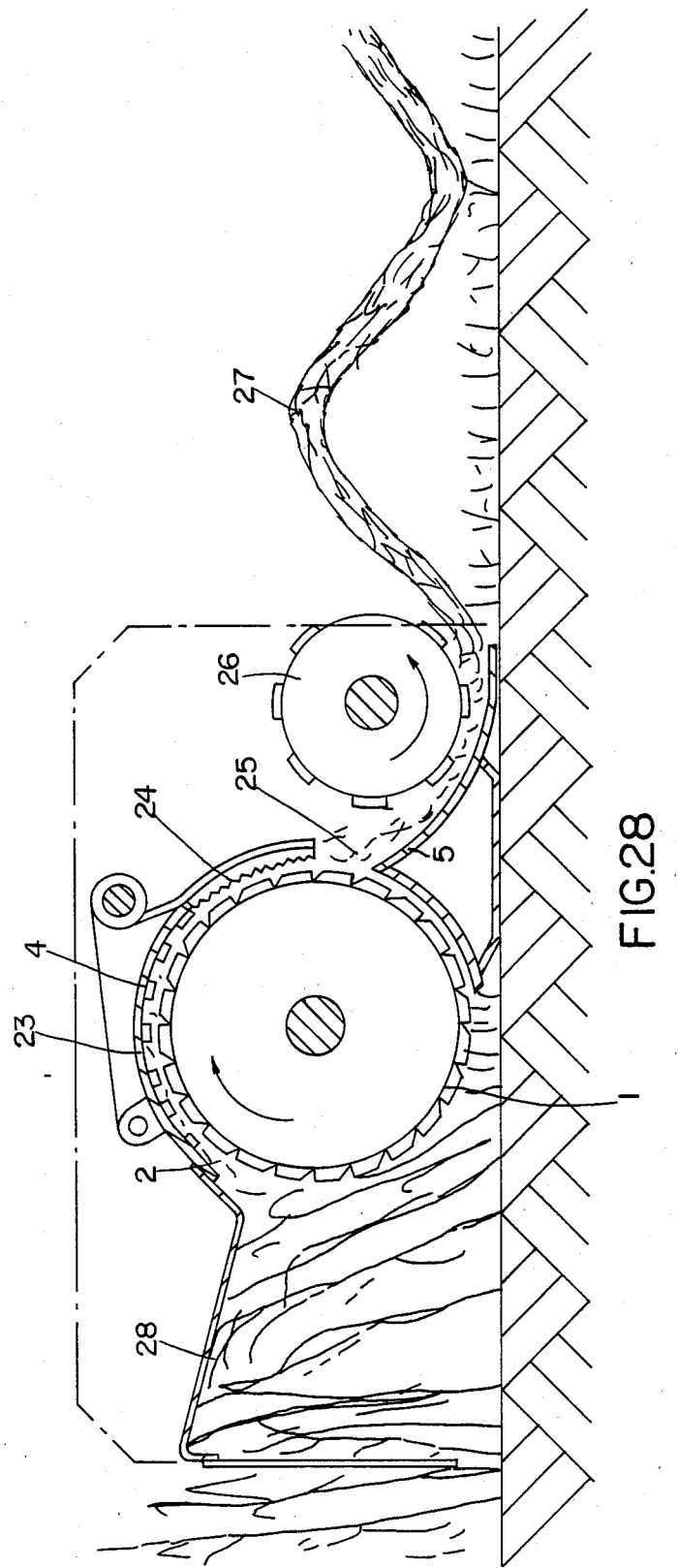
FIGS. 28–31 show a sixth preferred embodiment of the present invention employing the invented mowing worm as a mowing and collecting machine.

As a sixth preferred embodiment, FIG. 28 and the following figures depict the use of the invented worm mower as a mowing and collecting machine for stalk material.

Figure 29:
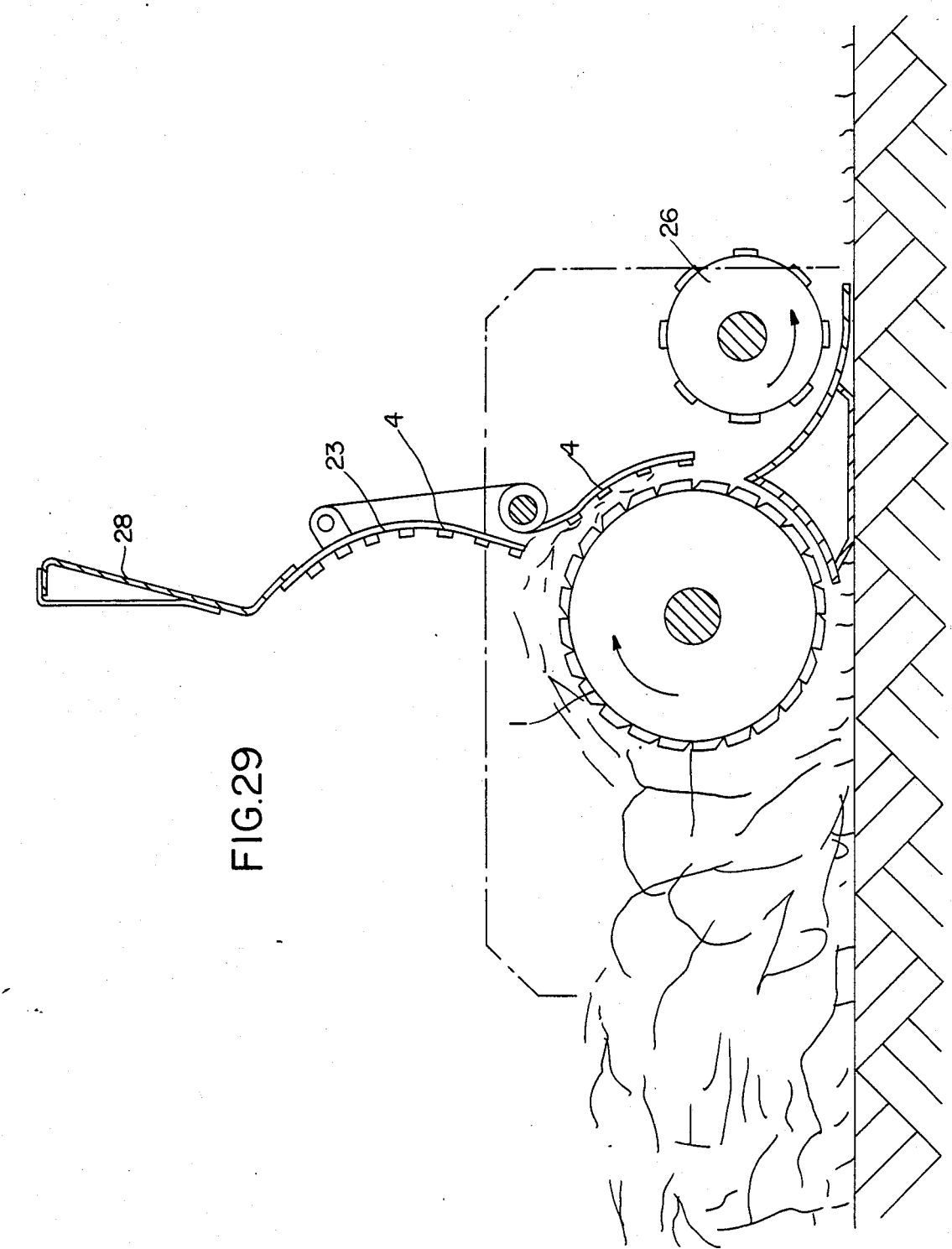

In order to accelerate drying the mowed stalk material, it is well-known to process the stalks and leaves by means of breaking crushing or shredding. An even more intensive mechanical processing may be attained by means of the cutting worm itself in joint operation with the bar lining on the inside of the hood (FIG. 28). The cutting worm 1 lifts the mowed material 2 and guides it past the bar line 23 of the mowing worm in the upper area of the hood; the mowed material is cup up and crushed in this manner. The adjoining bar lining 24 features a more shallow extrusion depth. The already pre-cut material is ripped into fibers and ground in this bar area. The worm 1 then throws the finely shredded, fibrous material 25 into the narrow space between the sliding arc 5 and the roller 26. The extruded roller 26 has extrusions 36 moves the material under contact pressure to the rear and compresses it into a mat 27. The circumferential velocity of the roller 26 is somewhat faster so that the compressed stalk mat is deposited in waves on the stubble. In this manner, air can easily reach under the mat from the side and dry it from underneath. Following complete or partial drying, the mat 27 or a loose swath of stalk material may be picked up by the worm 1 again. The worm 1 then operates as a stalk material conveying worm, which is possible due to the relatively slight pitch of the worm (FIG. 29). Connected then to the worm 1 is a blower as already previously described in FIG. 17.

Figure 30:
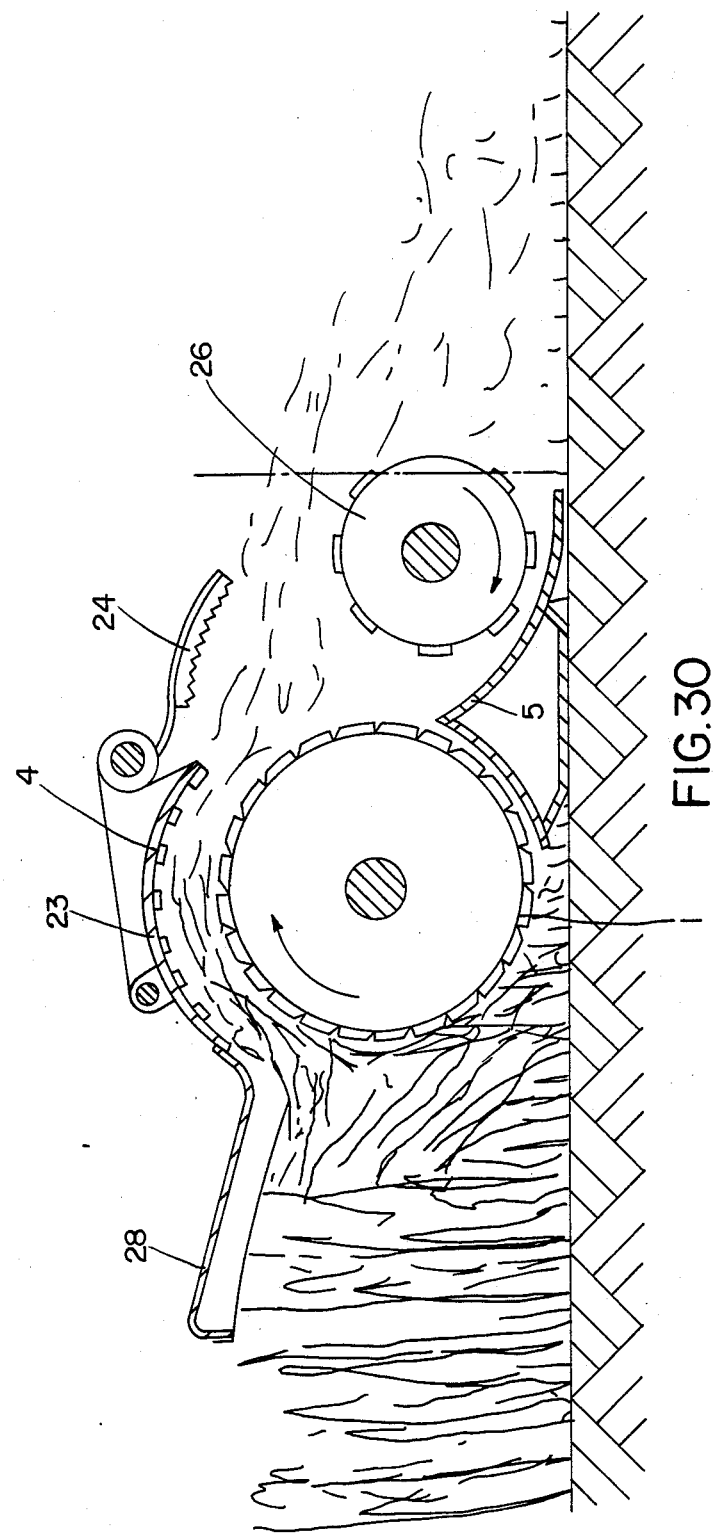
Figure 31:
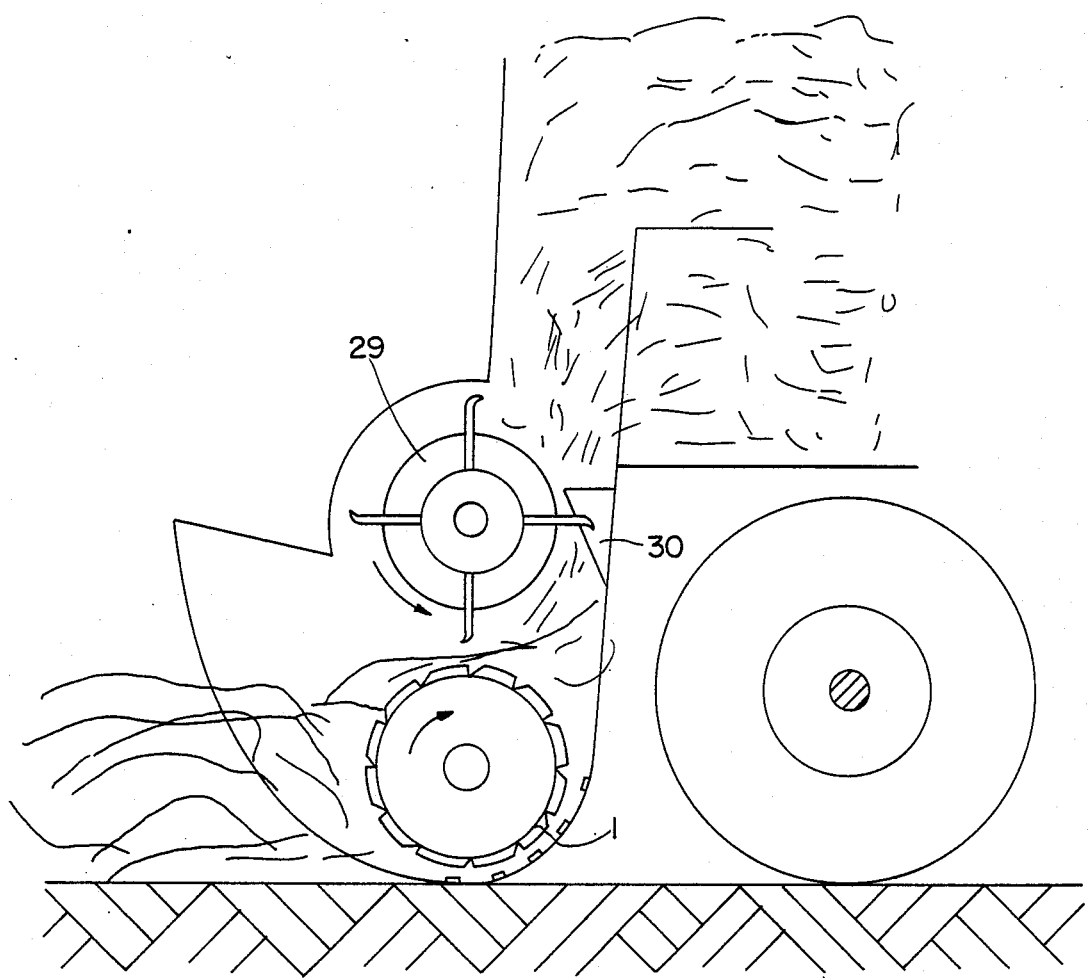

For picking up the loose, slack swath of stalk material, the guard cover 28 and the hood section lined with bars 4 is flapped back. The loose stalk material can flow easily without jamming along the raised wall surfaces in an axial direction into the discharge blower (FIG. 29). In FIG. 30, the bar section 23, 24 is raised or flapped back for mowing. This variable arrangement, as shown in FIGS. 28 and 29, also permits use as a mowing and pick-up device adjunct to a loading wagon. In FIG. 31, the conveyor roller 29 removes the stalk material from the worm 1 and passes it over the knife 30.

In the solutions previously described, the angle of inclination of the cutting worm to the bearing pipe or shaft lies below the angle of friction of the gliding friction between the worm and the material to be cut, for which the relation is:

Friction value $\mu = \alpha$

A friction value $\mu$ of 0.6 yields w 31x (for fresh stalk material)

The angle of friction of the material to be cut is determined by the angle of inclination of the material from the horizontal which would allow a body resting on the inclined material to slide downwardly along the material because of its own weight and gravitational force.

The angle of inclination of the cutting worm is to be selected below 31° for this embodiment in order that the worm discharges the mowed material after mowing. For large axial feed paths, a lining of bars arranged axially in the hood section covering the worm supports the conveyance in an axial direction, as previously described.

The present invention has been described in the preceding using preferred embodiments without the intention of limiting the scope of the overall inventive concept or of restricting the interpretations of the claims hereto.

What I claim is:

1. A worm mower for cutting stalk material of various kinds, having an auger cutting worm means, which turns at a high circumferential velocity about an axis of the auger cutting worm means, wherein the auger cutting worm means has an angle of inclination ($\alpha$) smaller than an angle of friction (glide angle) of the material to be cut, and wherein a circumference of said auger cutting worm means is provided in an axial direction of the auger cutting worm means axis with a continuous cutting surface, which is slightly inclined ($\gamma$) towards said auger cutting worm means axis so that the material to be cut is discharged at right angles to the auger cutting worm axis and is not bent along that axis.

2. A worm mower according to claim 1, wherein said cutting surface is provided with steps having a cutting line which encloses an angle ($\beta$) with said auger cutting worm axis.

3. A worm mower according to claim 1, wherein said cutting surface is provided with a wave-shaped ground edge.

4. A worm mower according to claim 1, wherein a hood means covers said auger cutting worm means.

5. A worm mower according to claim 4, wherein a side of said hood means which faces said auger cutting worm means is lined with bar means.

6. A worm mower according to claim 1, wherein an upper area of said auger cutting worm means is covered by a hood means having an inlet flow-in section which is lined with coarse bar means and followed by a section with finely extruding bar lining means.

7. A worm mower according to claim 6, wherein said coarse bar means are oriented parallel to the axis of said worm means and said bar lining means is designed with a V-shaped surface.

8. A worm mower according to claim 6, wherein said inlet flow-in section can be raised upwardly and rearwardly of the axis of the auger cutting mower means and said section with said bar lining means can be raised upwardly and forwardly of said axis.

9. A worm mower according to claim 1, wherein a baffle guide surface means is arranged behind said mowing worm means.

10. A worm mower according to claim 4, wherein said auger cutting worm means has a pitch which channels cut material to a center portion between ends of the auger cutting worm means and a catching basket is arranged behind said auger cutting worm means.

11. A worm mower according to claim 6, wherein a roller means is arranged downstream of said worm means, said roller means having extrusions, said roller means forming a space with a baffle guide surface means for receiving finely shredded material flowing between said worm means and bar lining means.

12. A worm mower according to claim 11, wherein said roller means is pressed, while turning, against the stalk material and rotates with a higher rotational velocity than the velocity of the mowing worm means for depositing a wavey compressed stalk material carpet.

13. A worm mower according to claim 6, wherein said cover means has a guard portion upstream of the inlet flow-in section and wherein the coarse bar section and guard portion can be raised upwardly and rearwardly of the axis of the auger cutting mower means and at least one of a conveyor blower or a mechanical conveyor adjoins said worm means for picking up cut material.

14. A worm mower according to claim 1, wherein a shredded means and an ejection wheel means adjoin each other in a conveying direction of the cut material and wherein the shredder means and ejection wheel means rotate about an axis parallel to the axis of the auger cutting worm means.

15. A worm mower according to claim 4, wherein said hood means is extended upwardly and rearwardly to act as a guide wall to form a conveyor trough in an area rearwardly of said auger cutting worm means.

16. A worm mower according to claim 4, wherein said hood means carries a tactile means in front of said auger cutting worm means and wherein said auger cutting worm means is picked up by a hinged parallelogram linkage having a lower rod which is shorter than a top rod.

17. A worm mower according to claim 1, wherein a topping means consisting of a tactile means and a topping knife are fixed in a machine frame and wherein they are located rearwardly behind said auger cutting worm means.

18. A worm mower according to claim 1, wherein said auger cutting worm means turns clockwise and is covered rearwardly with a hood means to which tactile finger means are arranged; said tactile finger means passing forward and curved upward in the clockwise turning direction like a sled runner and rearwardly of which lies a topping knife means; said knife means extended downward by a distance (a) in relation to a bottom edge of the tactile finger means to touch topmost portions of the root crop material to be cut.

19. A worm mower according to claim 1, wherein tactile finger means are located ahead of said auger cutting worm which turns counter-clockwise and wherein a bottom edge of said tactile finger means lies higher by the distance a in relation to a bottom edge of said auger cutting means; and wherein there is a knife means arranged under and touching said mower worm means.

20. A worm mower means according to claim 1, wherein said auger cutting worm means includes a blade portion means which has a pitch and which is interrupted by support section portion means which extend over the blade means by a slight amount (b) in a radial direction and extend as flat segments vertically and at right angles to the axis of the auger cutting worm means; and wherein a knife means passes under said auger cutting worm means by a distance (a) for topping off a top slice of the material to be cut.

21. A worm mower according to claim 1, wherein said auger cutting worm means is contacted in the radial direction by a whetstone which can move back and forth axially on a rod for sharpening the auger cutting worm means.

22. A worm mower according to claim 1, wherein said auger cutting worm means is driven by an electric engine rotor which is located about a core of said auger cutting worm means.

* * * * *

UNITED STATES PATENT AND TRADEMARK OFFICE
CERTIFICATE OF CORRECTION

PATENT NO. :  4,920,737
DATED      :  May 1, 1990
INVENTOR(S):  Franz Wieneke

It is certified that error appears in the above-identified patent and that said Letters Patent is hereby corrected as shown below:

Title page:

Please delete:

[73]   Assignee:   Munich, Steinmann, Schiller,
                   Munchen, Fed. Rep. of Germany The inventor Franz Wieneke is the owner of this patent.

Signed and Sealed this

Second Day of June, 1992

Attest:

DOUGLAS B. COMER

Attesting Officer            Acting Commissioner of Patents and Trademarks